United States Patent
Hasegawa et al.

(10) Patent No.: US 10,359,964 B2
(45) Date of Patent: Jul. 23, 2019

(54) REDUCING TIME TO READ MANY FILES FROM TAPE

(71) Applicant: International Business Machines Corporation, Armonk, NY (US)

(72) Inventors: Tohru Hasegawa, Tokyo (JP); Masayuki Iwanaga, Urayasu-si (JP); Yutaka Oishi, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 92 days.

(21) Appl. No.: 14/965,010

(22) Filed: Dec. 10, 2015

(65) Prior Publication Data

US 2017/0168735 A1 Jun. 15, 2017

(51) Int. Cl.
    *G06F 3/06* (2006.01)
(52) U.S. Cl.
    CPC .......... *G06F 3/0643* (2013.01); *G06F 3/065* (2013.01); *G06F 3/0608* (2013.01); *G06F 3/0682* (2013.01)
(58) Field of Classification Search
    CPC .... G06F 3/0619; G06F 3/0643; G06F 3/0647; G06F 3/0685; G06F 17/30233; G06F 17/30235; G06F 17/30073; G06F 3/0608; G06F 3/0682; G06F 3/065; G06F 3/0686
    See application file for complete search history.

(56) References Cited

U.S. PATENT DOCUMENTS

| | | | |
|---|---|---|---|
| 5,973,625 A * | 10/1999 | Nam | H04N 5/9262 341/50 |
| 7,739,312 B2 | 6/2010 | Gordon et al. | |
| 8,131,924 B1 * | 3/2012 | Frandzel | G06F 3/0608 711/111 |
| 8,856,076 B2 | 10/2014 | Amir et al. | |
| 9,098,432 B1 * | 8/2015 | Bachu | G06F 11/1076 |
| 2007/0101113 A1 * | 5/2007 | Evans | G06F 9/4406 713/1 |
| 2007/0174366 A1 * | 7/2007 | Palapudi | G06F 17/30233 |
| 2008/0109498 A1 * | 5/2008 | Bhandiwad | G06F 17/30073 |
| 2008/0320057 A1 * | 12/2008 | Palapudi | G06F 17/30233 |
| 2009/0089523 A1 * | 4/2009 | Tsaur | G06F 11/1461 711/162 |

(Continued)

OTHER PUBLICATIONS

Gharaibeh et al., "CloudDT: Efficient Tape Resource Management using Deduplication in Cloud Backup and Archival Services", Sep. 1, 2012, 978-3-901882-48-7 (c) 2012 IFIP, 5 pages.

(Continued)

*Primary Examiner* — Michael Krofcheck
(74) *Attorney, Agent, or Firm* — David B. Woycechowsky

(57) ABSTRACT

Employing a virtual archive file (VAF) to improve access efficiency to files stored on sequential-access media. A rule is received for identifying a plurality of files existing on a sequential-access medium which are to be accessed as a single archive file. A virtual archive file is created on a random-access medium to represent the plurality of files. Content metadata of the virtual archive file, which contents metadata includes identifying information for each file in the plurality of files, is dynamically generated based on the rule. In response to an instruction to perform a read-only operation on the virtual archive file, the read-only operation is performed on the plurality of files as a whole.

12 Claims, 5 Drawing Sheets

(56) References Cited

U.S. PATENT DOCUMENTS

| | | | | |
|---|---|---|---|---|
| 2011/0225209 | A1* | 9/2011 | Volvovski | G06F 12/0646 |
| | | | | 707/803 |
| 2011/0238716 | A1* | 9/2011 | Amir | G06F 3/0611 |
| | | | | 707/823 |
| 2012/0054428 | A1* | 3/2012 | Butt | G06F 3/061 |
| | | | | 711/111 |
| 2012/0162807 | A1 | 6/2012 | Katagiri et al. | |
| 2012/0300330 | A1 | 11/2012 | Martin | |
| 2012/0323934 | A1* | 12/2012 | Amir | G06F 17/30091 |
| | | | | 707/752 |
| 2013/0117239 | A1* | 5/2013 | Hasegawa | G06F 17/30091 |
| | | | | 707/687 |
| 2014/0181396 | A1* | 6/2014 | Vincent | G06F 3/0605 |
| | | | | 711/111 |
| 2014/0282472 | A1* | 9/2014 | Vinograd | G06F 8/63 |
| | | | | 717/170 |
| 2015/0154222 | A1* | 6/2015 | Ashida | G06F 17/30091 |
| | | | | 707/610 |
| 2015/0347022 | A1* | 12/2015 | Ashida | G06F 3/0607 |
| | | | | 711/113 |

OTHER PUBLICATIONS

"Archive file", Wikipedia, the free encyclopedia, as of Mar. 27, 2015, 3 pages, <https://en.wikipedia.org/w/index.php?title=Archive_file&oldid=653694037>.

"Linear Tape File System", Wikipedia, the free encyclopedia, as of Jul. 27, 2015, 10 pages, <https://en.wikipedia.org/w/index.php?title=Linear_Tape_File_System&oldid=673349768>.

"Tar (computing)", Wikipedia, the free encyclopedia, as of Jul. 26, 2015, 8 pages, <https://en.wikipedia.org/w/index.php?title=Tar_(computing)&oldid=673090383>.

* cited by examiner

REDUCING TIME TO READ MANY FILES FROM TAPE

BACKGROUND

The present invention relates generally to the field of data retrieval from sequential access storage media (such as a tape drive).

Linear tape file system (LTFS) is an open-standard format, including protocols for recording data on magnetic tape. LTFS is also software that enables access to data on a magnetic tape via a file system interface. In accordance with the LTFS format, a tape cartridge is typically divided into two partitions as follows: (i) an index partition which records meta-information such as information associated with the allocation of files; and (ii) a data partition which is used to record file data.

An archive file is a collection of one or more computer files stored as a single file. Archive files may include directory structure information and may store the collection of files in a compressed and/or encrypted format. Archive files that include directory information for the files they contain allow for automatic reconstruction of the file system relationships among the files in the archive even after the archive is stored or transmitted via systems that do not support the subject file system.

A "tar" archive file is a well-known type of archive file that adheres to some version of the "tar" (or "tape archive") file format. Typically, each file contained in a tar archive is represented by a 512-byte file header followed by an appropriate number of 512-byte data blocks containing the file's content.

SUMMARY

According to an aspect of the present invention, there is a method, computer program product and/or system that performs the following operations (not necessarily in the following order): (i) receives a rule for identifying a plurality of files, existing on a sequential-access medium, to be accessible as a single archive file; (ii) creates a virtual archive file, on a random-access medium, to represent the plurality of files; (iii) dynamically generates, based on the rule, content metadata of the virtual archive file, which content metadata includes identifying information for each file in the plurality of files; and (iv) in response to an instruction to perform a read-only operation on the virtual archive file, performs the read-only operation on the plurality of files as a whole.

DETAILED DESCRIPTION

Figure 1:
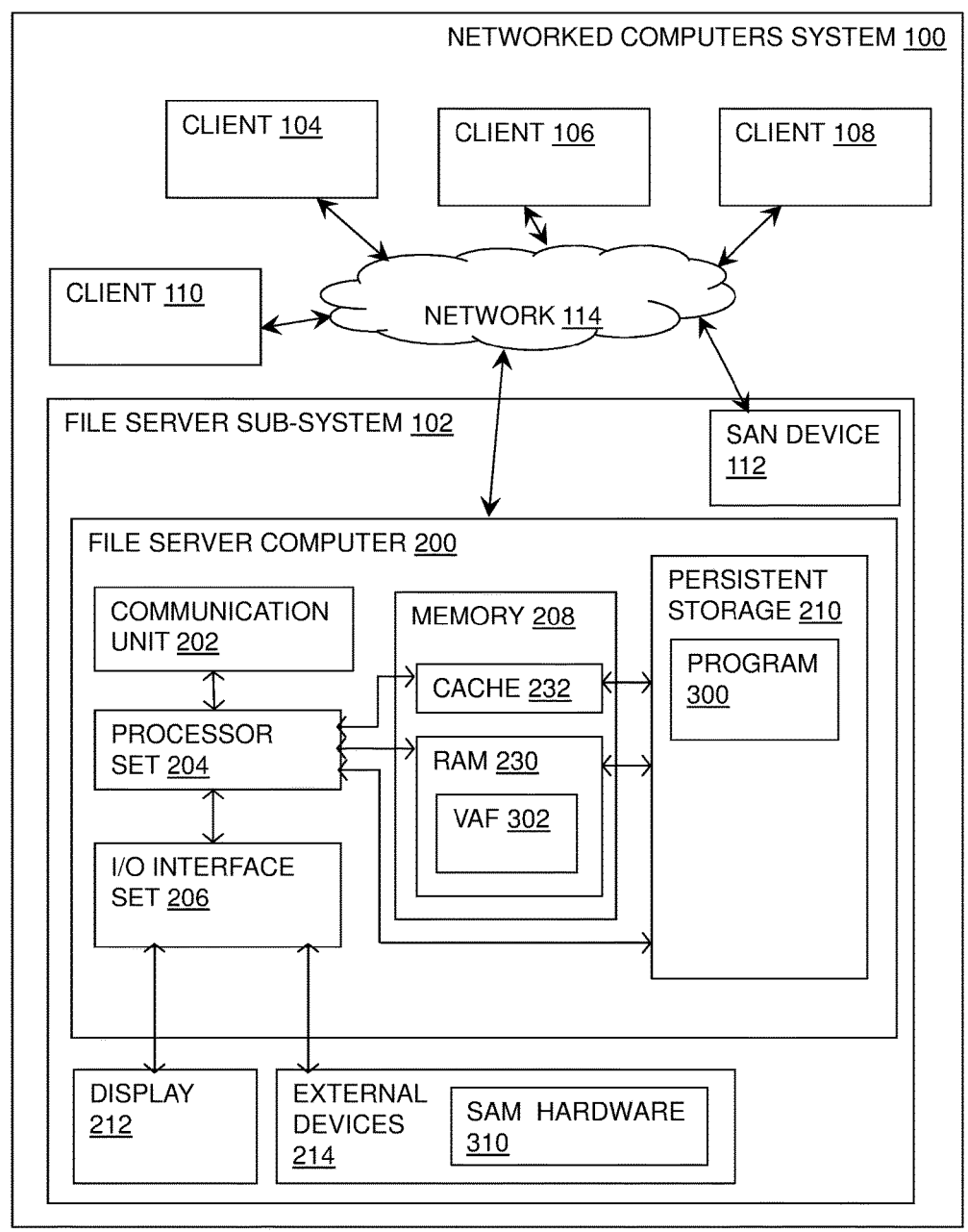
FIG. 1 is a block diagram view of a first embodiment of a system according to the present invention.

Some embodiments of the present invention dynamically generate a virtual archive file representing a collection of files that exist on a sequential access medium (SAM). The virtual archive file permits access to the collection via a corresponding single access operation on the virtual archive file stored on a storage device other than the SAM to which it relates, and its contents are generated dynamically. Because the virtual archive file exists on a storage medium other than the SAM (such as on a random-access storage medium), the virtual archive file can be easily referenced and manipulated without the need to access the SAM. In some embodiments, the files of the collection are operated on in the same order in which the files are stored on the SAM, which is potentially more efficient (for example, less need to wind a tape back and forth relative to a tape head).

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: file server sub-system 102; client sub-systems 104, 106, 108, and 110; storage area network (SAN) device 112; communication network 114; file server computer 200; communication unit 202; processor set 204; input/output (I/O) interface set 206; memory device 208; persistent storage device 210; display device 212; external device set 214, including sequential access medium (SAM) hardware 310; random access memory (RAM) devices 230; cache memory device 232; virtual archive file 302; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices not directly attached to computer 200. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. External device set 214 includes sequential access medium device 310, which in this embodiment is a tape drive. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
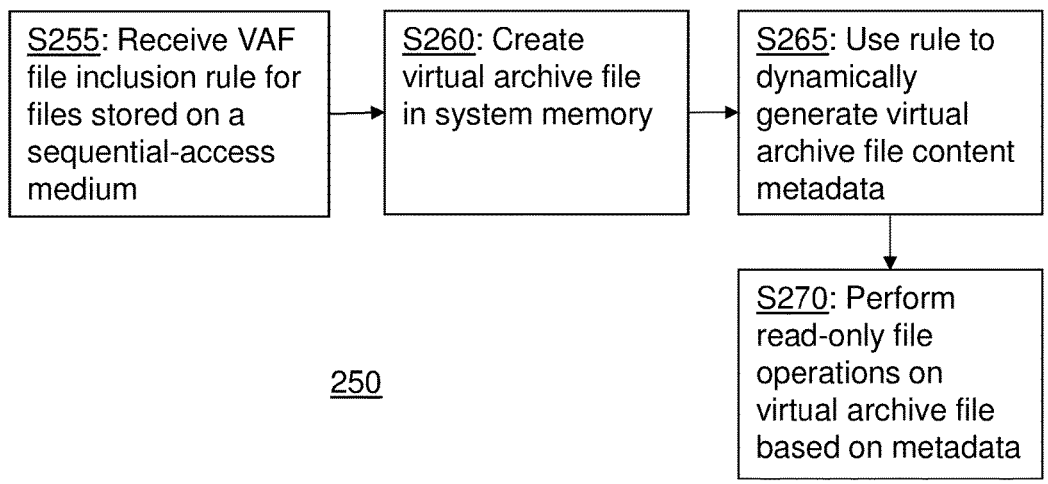
FIG. 2 is a flowchart showing a first embodiment method performed, at least in part, by the first embodiment system.
Figure 3:
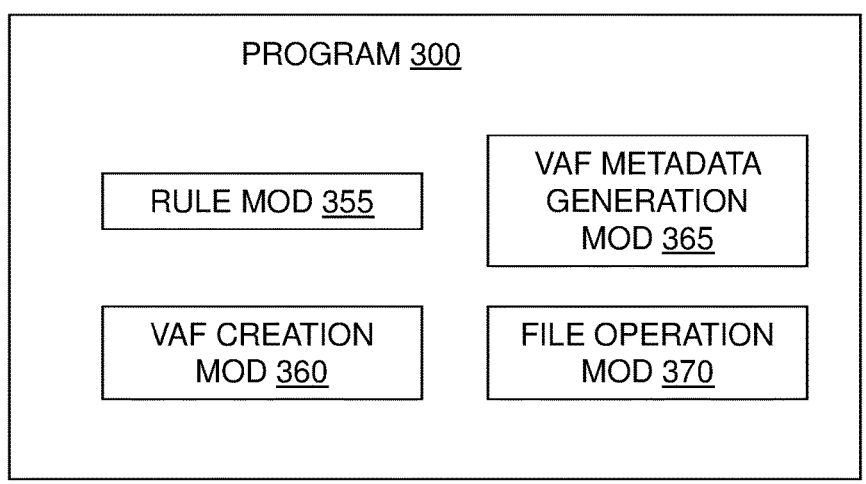
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated processing modules will now be discussed, over the course of the following paragraphs, with extensive reference to FIG. 2 (for the method operation blocks) and FIG. 3 (for the processing modules).

Processing begins at operation S255, where rule module ("mod") 355 receives a rule for creating a virtual archive file (VAF) to represent a collection of files stored on a sequential access medium (SAM). A sequential access medium, or sequential access storage medium, is a medium on which data is stored in such a fashion that it is accessed sequentially, or in some predetermined ordered sequence, rather than randomly. A magnetic tape is a familiar example of a sequential access medium. If starting at the beginning of the tape, data at the end of the tape cannot be reached without passing over all the data in between. This is an example of sequential access being imposed by hardware. Random access memory hardware can in some cases also be considered a sequential access medium if data is accessed via, say, a simple linked-list style data structure, where the only way to reach the data at the N-th node of the list is to traverse the list node by node from the beginning (or end). That is, there is no way to directly access the N-th node without traversing intervening nodes. This is an example of sequential access being imposed by software. In this embodiment, the SAM is a set of tapes in a tape library, accessed via SAM hardware 310 directly attached to file server 102 (see FIG. 1). Other architectural alternatives will be readily apparent to one of ordinary skill in the art—for example, the SAM could be available via storage area network (SAN) device 112, operating in the cloud.

The rule permits a VAF "shell" to be created, and specifies how the contents of the VAF are to be determined. For example, in this embodiment, the rule is "if a client provides a filename list for a VAF, create a VAF for that list." Other, non-exhaustive example rules are "create a VAF for each directory represented by a file on the SAM," "create a VAF for each set of files in a filename list, where the sets are delimited by a specified character sequence," and "create a VAF for all files on a SAM less than 10 MB in size." Any number of rules may be in use simultaneously.

Processing proceeds to operation S260, where VAF creation module ("mod") 360 creates one or more VAFs in system memory according to the rule discussed above. In this embodiment, client 106 (see FIG. 1) provides a filename list, so a VAF named "Client106-UserDefinedFile-1.tar," is created in system memory. Although the VAF is created in system memory rather than on the SAM, it appears in the filesystem as if it were an archive file on the SAM, and can be accessed as such for certain file operations, discussed below. Like other types of files, a VAF has data content that can be accessed by standard file access methods. Although in this example the VAF is in the "tar" format, any appropriate file format may be used for a VAF.

Processing proceeds to operation S265, where virtual archive file (VAF) content metadata generation mod 365 dynamically generates content metadata of the VAF created above, in accordance with the rule. The content metadata of a VAF will typically include information identifying two or more files contained on the SAM which are to be included in the archive and which, by virtue of this inclusion, may be jointly accessed by one or more commands as if they were a single file. In this embodiment, the content metadata is derived from the filename list received from client 106, which includes the fully-qualified names of three files on a single tape of the tape library: (i) F:\DeptA\planning\foo.txt; (ii) F:\DeptB\bar.xml; and (iii) F:\recipes\goobar.jpg. By providing this list, client 106 is indicating an interest in being able to treat this set of files as a single file for performing certain file operations, discussed below. In general, there are no constraints on the information used to identify the files to be included in the collection or the source from which such information is received. For example, in one alternative embodiment where each directory represented on the SAM is automatically considered to constitute a VAF, file information may be obtained from SAM hardware 310 (see FIG. 1) when index information is loaded from the index partition of a tape (and also when directories are added or deleted), or whenever an instruction is received to perform a file operation on the VAF.

The virtual archive file is not stored on the tape, but references the three files named above that are stored on the tape. This approach allows a user of a SAM system incorporating the present invention to reference the three files above as a single file, while also maintaining compatibility with conventional SAM systems and permitting VAF creation/adaptation/deletion on the fly without requiring modifications to the tape. For example, if client 106 were to add a fourth file existing on the tape to the filename list, the VAF would be automatically adapted to reflect this. Meta-information about the VAF, such as names and offsets of the tops of the files it references and overall size of the files collected under the VAF umbrella, may be obtained when the VAF is created/modified or when the information is needed (for example, to respond to a user command). In this way, the VAF is continuously dynamically (re)generated to reflect the latest set of files it is designed to encompass.

Processing proceeds to operation S270, where file operation mod 370 receives a command to perform a file operation on the VAF and responds accordingly. Operations that can be successfully performed on a VAF with respect to access to the files it references are invariant, or "read-only" file operations. These are operations that do not, in and of themselves, result in the referenced files being modified. Non-limiting examples include "open," "acquire metadata," "read," and "close." Some embodiments may permit variant file operations to be performed on a VAF itself—for example a command that changes the rules defining the set of files to be included in the VAF or deletes the VAF altogether—while still not allowing operations on the VAF that would modify the files referenced therein.

For examples of invariant file operations on a VAF, consider the VAF created above named "Client106-UserDefinedFile-1.tar." In the current embodiment, VAF content metadata is dynamically generated upon receipt of a command to perform a file operation on the VAF, so example operations will be processed as follows: An "open" or "close" operation on this file will cause the system to: (i) consult the filename list provided by client 106; and (ii) open or close, respectively, the three files found referenced therein. Similarly, querying meta-information about the VAF will cause the system to: (i) consult the filename list provided by client 106; and (ii) return meta-information pertaining to the whole collection of the three files found referenced therein—for instance, the file size returned will be the sum of the sizes of the three individual files collected under the VAF umbrella. Reading the VAF will cause the system to: (i) consult the filename list provided by client 106; and (ii) read the contents of all of the individual files collected under the VAF umbrella. (In other embodiments, the list need not be consulted upon receipt of a command, but is instead consulted, say, whenever it is changed during the life of the VAF. In either approach, the VAF contents are dynamically generated to reflect current information.) In each case, only a single file system operation is required to initiate the operation on all the files in the collection represented by the VAF. In some embodiments of the present invention, when an operation on a VAF is invoked, the references to the individual files of the VAF are also arranged in the order they appear on the SAM so that the files may be operated on in that same order, potentially producing additional efficiency gains.

III. Further Comments and/or Embodiments

Some embodiments of the present invention recognize the following facts, potential problems and/or potential areas for improvement with respect to the current state of the art: (i) in the broadcasting/video production field, innovation from a conventional workflow centered on a video tape to a file-based workflow is rapidly advancing; (ii) file storage using an open-standard magnetic tape digital data storage technology in a file-based workflow has been utilized; and/or (iii) a factor in the adoption of such tape storage technology within the broadcasting/video production field is the appearance of the Linear Tape File System (LTFS).

Some embodiments of the present invention further recognize: (i) that at least some LTFS systems record information to a tape in a format that logically divides tape storage area into a data partition and an index partition such that internal information ("metadata") about the file system, such as a position of a file on the tape, is mainly saved in the index partition, while the file body ("content" or "data") is saved in the data partition; (ii) that file systems compatible with the LTFS format include both systems enabling access to a tape inserted in a single tape drive, as well as systems enabling access to multiple tapes inserted in a tape library; (iii) that in either type of system, index information in the index partition may be read and expanded in memory when a tape is mounted, such that it is possible to respond to acquisition of a file list by a "dir" ("directory") command or the like without accessing the tape; and/or (iv) that when reading a file, the position at which the data is written on the tape may be determined from the index information in the memory, and the data then read from the tape to respond with the data accordingly.

Further, some embodiments of the present invention recognize: (i) that files stored in the broadcasting/video production field include not only video data of movies, television programs, commercials and the like but also data of video materials generated accompanying creation of the video data; (ii) the material data may be generated as a great number of very small files (for example, in the case of video materials for a commercial, images obtained by photographing one object from various angles may be stored to be reused, resulting in several thousands to several tens of thousands of relatively small files, each several megabytes to several tens of megabytes in size, stored in one directory even if a certain number of directories are created to store the files); and/or (iii) because the storage method involved is specified by an application used in the broadcasting/video production field, it is not easily changed.

Still further, some embodiments of the present invention recognize: (i) that generally, files in the broadcasting/video production field selected for storage on tape or other sequential access storage media are those which are not expected to be reused after their primary use (such as the creation or editing of a target movie, television program, or commercial) on a random access storage device such as a hard disk drive (HDD) ends; (ii) that this is because when random file access is sought on a tape or other sequential access storage media, much time is required for seeking the beginning of a file (positioning the tape), and therefore primary use from such a medium is inefficient; and/or (iii) for similar reasons, a file stored on tape that is to be reused is typically first restored to a HDD or other random access storage medium.

Some embodiments of the present invention recognize: (i) that when LTFS is used to restore a great number of such relatively small files that are used in the broadcasting/video field onto a HDD from a tape, the times required for restoring may be long (for example, transfer rates for copying 10 GB worth of files ranging in size from 1 MB to 100 MB each from a LTFS to a HDD may vary from about 118 MB/s for one hundred 100-MB files down to only about 30 MB/s for 10,000 1-MB files; see also FIG. 6); and/or (ii) that this is because copying of the files from LTFS to a HDD is performed in the following fashion:

---

(a) open file on LTFS;
(b) acquire meta-information about file on LTFS;
(c) create file on HDD;
(d) acquire meta-information of file on HDD;
(e) while data of file on LTFS remains to be read, read data from file on LTFS and write data to file on HDD;
(f) update meta-information of file on HDD;
(g) close file on HDD; and
(h) close file on LTFS.

---

(that is, when copying files, each time a file is copied operations are required to open the file, acquire meta-information about it, and close it on LTFS, and to create it, acquire meta-information about it, and update and close it on the HDD—in other words, there are certain relatively fixed costs associated with a file transfer that adhere on a per-file basis regardless of file size). For example, time required for copying three 1 MB files from LTFS to a HDD may be 15.6 milliseconds per file. As the number of files existing in the same directory increases, a longer time is required for processing inside LTFS. Although the required time does not increase in a strictly linear fashion according to the number of files, the time required when the number of files increases to several thousand can be measured in minutes, so the effect on time required for copying cannot be ignored. Even if the total amount of data transferred is the same, the transfer rate becomes slower as the number of files increases.

Some embodiments of the present invention therefore recognize: (i) that this decreased transfer rate is a burden on the restoration of large numbers of small files; (ii) that while files are being restored from a tape drive, the drive cannot be used for reading from or writing to another tape, so the potentially long times during which the tape drive is occupied and cannot be effectively utilized for another task is an additional source of inefficiency; and/or (iii) that the problem that a tape drive cannot be effectively utilized because of a decrease in the file transfer rate when restoring many files using LTFS is in need of a solution.

To address such concerns, some embodiments of the present invention add information about a file which does not actually exist on a tape to index information stored in the memory of a system using LTFS. This file corresponds to a collection of multiple files that do already exist on the tape, and data of these existing files is used to respond to access requests such as read requests. This file that does not actually exist on tape but instead virtually corresponds to a collection of files that do exist on the tape is sometimes referred to herein as a virtual archive file (VAF).

For example, in some embodiments of the present invention, a VAF is created using a tar file format. A VAF named "dir.tar" is added for each directory, the VAF being a collection of files in the directory combined in the tar format. At this time, each directory has the dir.tar file immediately under the directory. The "dir.tar" file does not create new data on the tape, but can be accessed as the collection of the files existing in the directory combined by tar.

As another example, in some embodiments of the present invention, when a user notifies LTFS of multiple files via an extended attribute of LTFS, a tar file having a special name is prepared immediately under a mount point, and the tar file can be accessed as an integrated collection of all the specified files.

In such examples, the tar file (VAF) is created such that the order of files in the tar file is the same as the order of the files on the tape, so a file can be read without rewinding the tape when reading via the tar file occurs. When many files are restored from LTFS, the files are read with the use of this VAF, resulting in shortened transfer times and more effective utilization of the tape drive.

In some embodiments of the present invention, software for known implementations of LTFS is extended so that a VAF tar file is prepared for each directory. This "dir.tar" file is given a special name and is added immediately under each directory in the index information stored in the memory of LTFS. When access to the "dir.tar" file occurs, a response is made as shown in Table 1:

TABLE 1

Response to VAF access requests

| FILE ACCESS | NORMAL RESPONSE |
| --- | --- |
| Open | Succeed |
| Close | Succeed |
| Acquire meta-information | (see below) |
| Read | (see below) |
| Other (for example, write) | Fail |

To respond to requests to acquire meta-information and read from the VAFs, some embodiments of the present invention recognize: (i) that tar is a known file format; (ii) that a tar file is an integrated collection of files, with a 512-byte header added to each of the files, such that the sequence of data in a tar archive is: file 1 header, file 1 content, file 2 header, file 2 content, and so on, with some terminal data at the end of the tar file archive; (iii) that the data size of each file is adjusted to correspond to an integer multiple of 512 bytes (in the case of shortage of data to fill the last 512-byte chunk, the empty space may be filled with zeroes), with the terminal data corresponding to a 1024-byte area filled with zeroes; (iv) that because of such a file format, the size of a tar file can be easily calculated if the files put into the tar file are determined or known; and/or (v) that at the time of reading data at any offset in the tar file, which file header or which part of the data is to be read can be easily calculated if the files put into the tar file and the order of the files are determined or known. Alternatively or in addition, some embodiments of the present invention: (i) assume that meta-information such as a filename, a timestamp, and access attributes is put in each header; and/or (ii) assume that meta-information (a timestamp, access attributes and the like) of the "dir.tar" file itself is given particular fixed values, except that the file size corresponds to a total value of the sizes of the files existing in the directory.

Figure 4:
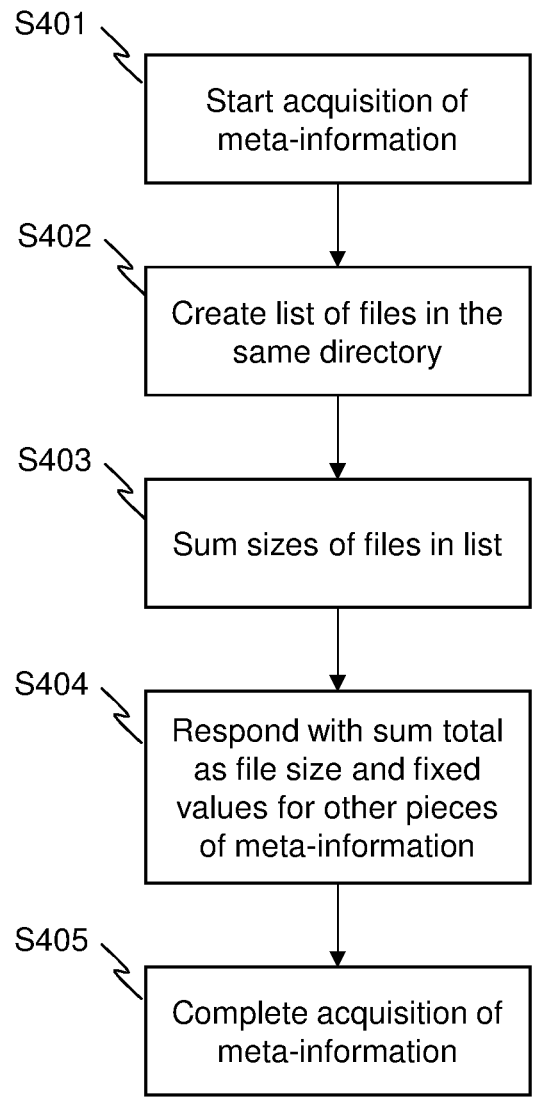
FIG. 4 is a flowchart showing a second embodiment method performed, at least in part, by a second embodiment system according to the present invention.

Shown in FIG. 4 is flowchart 400, illustrating the operations that occur when a request to acquire meta-information is made. In operation S401, acquisition of meta-information begins. In operation S402, a list of the files in the directory of interest is created. In operation S403, the sizes of the files in this list is totaled. This total value is returned in the response to the meta-information request, along with fixed values for the other pieces of meta-information, in operation S404. Acquisition of meta-information is then completed in operation S405. Note that in alternative embodiments, alternatives to fixed values may be used for some or all other pieces of meta-information. For example, a "last-modified" metadata field may be given the timestamp value of the most recently modified file in the directory.

In some embodiments of the present invention: (i) reading of a file is performed in response to a request to read the data of the file, where, generally, an offset of the file to be read and a buffer in which to put the result of reading are handed to the file system; and/or (ii) LTFS is extended to respond to such a request, and the data is put into the buffer as next described to respond to the read request. When a request is made to read a "dir.tar" file from the top (offset 0), a list L of files existing in the directory is created, with the files in the list sorted in the order they occur on the tape, on the basis of the positions of the tops of the files. A response is made by calculating the header of the file to be read or the position of the data of the file from the offset and putting the result into the buffer.

Figure 5:
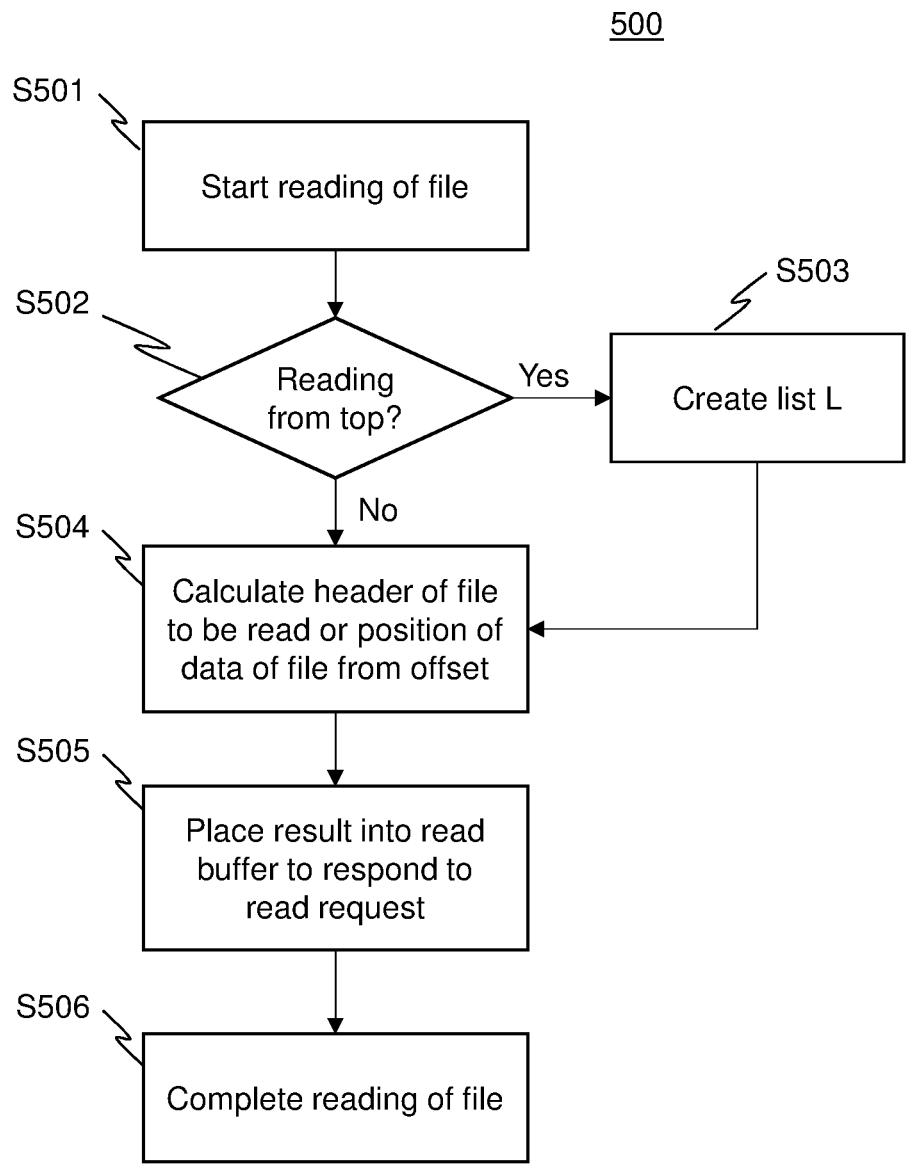
FIG. 5 is a flowchart showing a third embodiment method performed, at least in part, by the second embodiment system.

Shown in FIG. 5 is flowchart 500, illustrating the operations that occur when a request to read data is made. In operation S501, reading of the file begins. In operation S502, a decision is made as to whether the read is to occur from the top (offset 0). If so, a list L of files existing in the directory of interest is created in operation S503. In either case, the header of the file to be read or the position of the file data from the offset is calculated (S504) and the result of the read is put into a buffer in operation S505. The read request is then completed in operation S506. From a filesystem viewpoint, the read request is completed by filling the buffer that is provided by application. However, if the read request (for example, IRP_MJ_READ/read( ) is part of the larger operation of, say, copying the contents of a VAF in tar format from an LTFS tape to a hard disk drive (HDD), the copy command will read the VAF by read request, then write the data to the HDD. In such a case, the result on the HDD is an actual tar file.

In the above-described embodiments, a tar file is prepared for each directory as a VAF. However, a user may specify multiple files to be read and create a VAF tar file by integrating these files. For example, in some embodiments of the present invention, a file is prepared in which paths to files to be collectively read are written. For example, a list file containing the following information may be prepared:

F:\dir1\file1
F:\dir2\dir3\file2
F:\dir4\file3

By writing the path of the list file in an extended attribute (such as in ltfs.filelist) of the root directory of LTFS, information about a "files.tar" file is added to the index information in the memory of LTFS as if the "files.tar" file existed in the root directory. Data is not added onto the tape at all, and access to the "files.tar" file is performed on the basis of data already written on the tape. Specifically, access to the "files.tar" file may be treated as in the case of the "dir.tar" files described above. However, at the list-creation stage, whereas in the embodiments above a list is created for files residing in the same directory, the list here is generated from the files written in the file specified by being written in ltfs.filelist. It is thereby possible to enable a file specified by the user to be accessed as the "files.tar" file.

Although the tar file format is used for a VAF in the above implementation examples, other file formats (such as zip, for example) for integrating multiple files may be used, and compression or other such files operations (for instance, encryption) may also be simultaneously performed.

Figure 6:
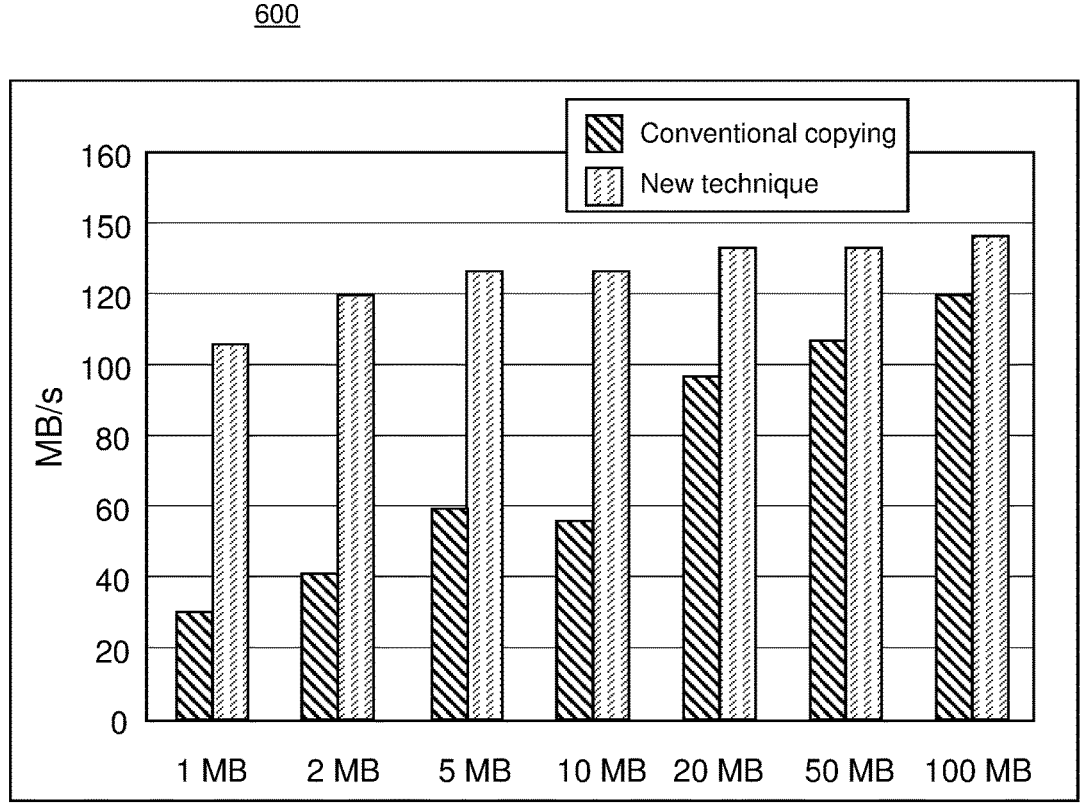
FIG. 6 is a graph showing exemplary data transfer rates with respect to file size for a third embodiment system according to the present invention.

Shown in FIG. 6 is graph 600, depicting exemplary transfer rates of an embodiment of the present invention relative to its conventional counterpart. In the embodiment, a tar file (VAF) is prepared for each directory and the effects of copying files are measured. In the case of copying 10,000 1-MB files, copying is performed at about 105 MB/s, some 3.5 times faster than the conventional transfer rate of 30 MB/s.

As for file read and copying as a tar file, it is necessary to expand the tar file at the time of using each individual file. It can be performed separately from an operation of LTFS. Because it is possible to expand the tar file without using a tape drive, it is possible to shorten the time during which the tape drive is occupied, improving effective tape drive utilization, by using the tar file to improve the file transfer rate. That is, it is possible to solve the problem of ineffective tape drive utilization due to a decrease in the file transfer rate when many files are restored.

Some embodiments of the present invention may include one, or more, of the following features, characteristics and/or advantages: (i) permit access each of multiple individual files as well as accessing a single integrated file of the multiple files as a virtual archive file (VAF; for example, a tar file); (ii) dynamically generate a VAF; (iii) generate a VAF in which the order of files in the VAF corresponds the order on a tape or other sequential-access media; (iv) permit easily adding, changing, or deleting a file, because data for a VAF is not written on a tape (that is, data of a file is not fixed)—for example, if creating a "dir.tar" file for each directory, even if a file is added into a directory or a file in a directory is deleted, it is possible to read a collection of files existing in the directory at the time of reading the "dir.tar" file without re-creating a tar file; and/or (v) suppress movement of a head on a tape and shorten the time required for reading, because a VAF is configured in the same order as the order on a tape (if the original order of files in a VAF is different from the order of the files on a tape, it would take much more time to read the VAF because of movement of a head on the tape).

Some embodiments of the present invention may include one, or more, of the following features, characteristics and/or advantages: (i) reduce the number of open, acquire metadata, and/or close operations required to perform access operations on a set of files stored on a sequential access medium; (ii) improve filesystem performance on a sequential access media filesystem such as Linear Tape File System by only having to perform a single LTFS "open," "acquire metadata," and "close" operation to read an entire directory (or other collection) of files; and/or (iii) access multiple files as one file in order to reduce open/acquire metadata/close in addition to reordering a list of files to match the file order on the sequential access medium, thereby improving file access performance.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Receive/provide/send/input/operate/output/perform/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Virtual archive file (VAF): a file that does not exist on a given storage device but instead references a collection of files that do exist on the storage device, and that allows file operations to be performed on the collection as if they existed on the storage device as a single file.

What is claimed is:

1. A method comprising:
reading, by a tape drive and a computer, a plurality of computer readable files (CRFs) from a tape medium and directory structure information for the plurality of CRFs into a random access memory device (RAM) of a computer;
constructing and storing, in the RAM, an archive file that includes the plurality of CRFs and the directory structure information, and
repeatedly performing the following operations:
revising the data on the tape medium so that each revision revises at least one of the following types of data on the tape medium: data of at least one CRF of the plurality of CRFs and the directory structure information, and
responsive to the revision of data on the tape medium, dynamically reconstructing and dynamically re-storing, in the RAM, an archive file that includes the plurality of CRFs and the directory structure information to create a current version of the archive file.

2. The method of claim 1 further comprising:
transmitting the current version of the archive file via a data communication system that does not support the directory structure information.

3. The method of claim 1 wherein the tape drive is linear tape file system (LFTS) tape drive, the method further comprising:
receiving, from a user, notification of an identity of the files included in the plurality of CRFs through an extended attribute of LTFS; and
preparing the archive file immediately under a mount point for the plurality of CRFs.

4. The method of claim 1 wherein:
the current version of the archive file is in TAR format; and
the current version of the archive file includes TAR header information that includes a 512 byte header for each CRF of the plurality of CRFs.

5. A computer program product (CPP) comprising:
a computer readable storage medium; and
computer code stored on the computer storage medium, with the computer code including data and instructions to cause a processor(s) set to perform at least the following operations:
reading, by a tape drive and a computer, a plurality of computer readable files (CRFs) from a tape medium and directory structure information for the plurality of CRFs into a random access memory device (RAM) of a computer;
constructing and storing, in the RAM, an archive file that includes the plurality of CRFs and the directory structure information; and
repeatedly performing the following operations:
revising the data on the tape medium so that each revision revises at least one of the following types of data on the tape medium: data of at least one CRF of the plurality of CRFs and the directory structure information, and
responsive to the revision of data on the tape medium, dynamically reconstructing and dynamically re-storing, in the RAM, an archive file that includes the plurality of CRFs and the directory structure information to create a current version of the archive file.

6. The CPP of claim 5 wherein the computer code further includes data and instructions for causing the processor(s) set to perform the following operation(s):
transmitting the current version of the archive file via a data communication system that does not support the directory structure information.

7. The CPP of claim 5 wherein:
the tape drive is linear tape file system (LFTS) tape drive; and
the computer code further includes data and instructions for causing the processor(s) set to perform the following operation(s):
receiving, from a user, notification of an identity of the files included in the plurality of CRFs through an extended attribute of LTFS; and
preparing the archive file immediately under a mount point for the plurality of CRFs.

8. The CPP of claim 5 wherein:
the current version of the archive file is in TAR format; and
the current version of the archive file includes TAR header information that includes a 512 byte header for each CRF of the plurality of CRFs.

9. A computer system (CS) comprising:
a processor(s) set;
a computer readable storage medium; and
computer code stored on the computer storage medium, with the computer code including data and instructions to cause the processor(s) set to perform at least the following operations:
reading, by a tape drive and a computer, a plurality of computer readable files (CRFs) from a tape medium and directory structure information for the plurality of CRFs into a random access memory device (RAM) of a computer;
constructing and storing, in the RAM, an archive file that includes the plurality of CRFs and the directory structure information; and
repeatedly performing the following operations:
revising the data on the tape medium so that each revision revises at least one of the following types of data on the tape medium: data of at least one CRF of the plurality of CRFs and the directory structure information, and
responsive to the revision of data on the tape medium, dynamically reconstructing and dynamically re-storing, in the RAM, an archive file that includes the plurality of CRFs and the directory structure information to create a current version of the archive file.

10. The CS of claim 9 wherein the computer code further includes data and instructions for causing the processor(s) set to perform the following operation(s):
transmitting the current version of the archive file via a data communication system that does not support the directory structure information.

11. The CS of claim 9 wherein:
the tape drive is linear tape file system (LFTS) tape drive; and
the computer code further includes data and instructions for causing the processor(s) set to perform the following operation(s):
receiving, from a user, notification of an identity of the files included in the plurality of CRFs through an extended attribute of LTFS; and
preparing the archive file immediately under a mount point for the plurality of CRFs.

12. The CS of claim 9 wherein:
the current version of the archive file is in TAR format; and
the current version of the archive file includes TAR header information that includes a 512 byte header for each CRF of the plurality of CRFs.

* * * * *